(12) United States Patent
Modai

(10) Patent No.: US 9,088,542 B2
(45) Date of Patent: Jul. 21, 2015

(54) FIREWALL TRAVERSAL DRIVEN BY PROXIMITY

(71) Applicant: AVAYA, INC., Basking Ridge, NJ (US)

(72) Inventor: Ori Modai, Ramat-Hasharon (IL)

(73) Assignee: AVAYA, INC., Basking Ridge, NJ (US)

( * ) Notice: Subject to any disclaimer, the term of this patent is extended or adjusted under 35 U.S.C. 154(b) by 0 days.

(21) Appl. No.: 14/016,679

(22) Filed: Sep. 3, 2013

(65) Prior Publication Data

US 2015/0067817 A1    Mar. 5, 2015

(51) Int. Cl.
*H04L 29/06*    (2006.01)
(52) U.S. Cl.
CPC ................... *H04L 63/0209* (2013.01)
(58) Field of Classification Search
USPC .......................................................... 713/11
See application file for complete search history.

(56) References Cited

U.S. PATENT DOCUMENTS

| | | | |
|---|---|---|---|
| 2005/0283823 A1* | 12/2005 | Okajo et al. | 726/1 |
| 2007/0256121 A1* | 11/2007 | Hassan et al. | 726/5 |
| 2009/0022152 A1* | 1/2009 | Henry et al. | 370/389 |
| 2011/0016204 A1 | 1/2011 | Wiener et al. | |

* cited by examiner

*Primary Examiner* — Yogesh Paliwal
(74) *Attorney, Agent, or Firm* — Cochran Freund & Young LLC

(57) ABSTRACT

Disclosed is a system and method enabling a mobile device to establish a communication channel with a device residing in the corporate network and in close physical proximity, without the requirement for a direct high speed network connection between the mobile and corporate devices. The system and method allow the mobile device tot maintain its existing network connection, with no special user/network credential access. The system and method enable an improved security control over the traffic that is transferred between the devices as these are filtered and controlled through a Firewall Traversal pairing server and not directly between devices.

16 Claims, 2 Drawing Sheets

FIREWALL TRAVERSAL DRIVEN BY PROXIMITY

FIELD OF THE INVENTION

The field of the invention relates generally to communications conferencing and credentialing and access to same.

BACKGROUND OF THE INVENTION

In many enterprise settings, mobile devices are connected through a WiFi network. The WiFi network in many cases may connect through a "guest" network which is hosted on a corporate DMZ, peripheral, network segment or a sub-segment of that network. A DMZ is a physical or logical sub-network that contains and exposes an organization's external-facing services to a larger and untrusted network. The untrusted network is often the internet. The purpose of a DMZ is to add an additional layer of security to an organization's local area network (LAN). An external attacker only has access to equipment in the DMZ, and not to any other part of the network.

In a computer network, the hosts most vulnerable to attack are those that provide services to users outside of the local area network, such as e-mail, web and Domain Name System (DNS) servers. Because of the increased potential of these hosts being compromised, they are placed into a specific sub-network in order to protect the rest of the network if an intruder were to succeed in attacking any of them. Hosts in the DMZ have limited connectivity to specific hosts in the internal network, although communication with other hosts in the DMZ and to the external network is allowed. This allows hosts in the DMZ to provide services to both the internal and external network, while an intervening firewall controls the traffic between the DMZ servers and the internal network clients.

SUMMARY OF THE INVENTION

An embodiment of the invention may therefore comprise a method for traversing a firewall, the method comprising sending a pairing request from a mobile device to a pairing and tunneling authorization service, sending a user authorization request from the pairing and tunneling authorization service to a corporate device, receiving a response to the user authorization from said corporate device at the pairing and tunneling authorization service and completing the pairing request.

An embodiment of the invention may further comprise a system for traversing a firewall, the system comprising a mobile device, a corporate device and a pairing and tunneling authorization service, wherein the mobile device is enabled to send a pairing request to the pairing and tunneling authorization service, the pairing and tunneling authorization service is enabled to request and receive authorization for the mobile device from the corporate device and complete the pairing request between the mobile device and the corporate device.

DETAILED DESCRIPTION OF THE EMBODIMENTS

Generally, a mobile device may not be able to gain access to other devices that are connected within a corporate network which is separated by a firewall. This may especially true when the mobile device is connecting through a WiFi network where the WiFi network is connected through a guest network which is hosted on the corporate DMZ network segment. This may also be the case even though the use and the mobile device are in close physical proximity to the corporate network, or corporate device. It is understood that the corporate devices may include video conferencing systems, executive systems, corporate telephones and other types of corporate systems.

In some scenarios, a user may attempt to connect via a mobile device directly to a corporate device in order to provide different services. These different services may include configuration exchange, transmission of video or audio captured from the mobile device, transfer of general information such as files or data, or other services. A peer to peer link may be established between the mobile device and the corporate device. It is understood that mobile devices may utilize different communication interfaces. These may include WiFi, blue tooth, NFC (near field communications), camera, microphone and speakers, as well as others. It is also understood that the communication speeds of different communications interfaces are themselves different. As such, some "low" speed interfaces may not be appropriate for high speed communication requirements for video and audio media exchange.

In many corporate devices, the only high speed interface available is a network connection. Some corporate devices have the ability for WiFi accessibility or to act as an access point. However, it is understood that for a mobile device to leverage this type of connection link, the mobile device often is required to disconnect from Internet access prior to establishing a direct network communication link to a corporate device. It is understood, that many corporations and entities may consider that opening network access via a corporate device and the corporate network to be a fundamental security risk. Accordingly, direct high speed communication may not be possible without traversing through a corporate firewall.

An example of a scenario that may require authorization for firewall traversal between a mobile device and a corporate device is where a user enters a meeting room with a mobile device and uses a wireless screen sharing application, such as "airplay" or "miracast" to share a presentation of an existing video conference system that resides in the same physical room. Another example of a scenario that may require authorization for firewall traversal between a mobile device and a corporate device is when a user desires to transfer a call from his mobile device to a desk phone when he enters an office, without transferring the call by using the desk phone as an accessory of the mobile phone.

Figure 1:
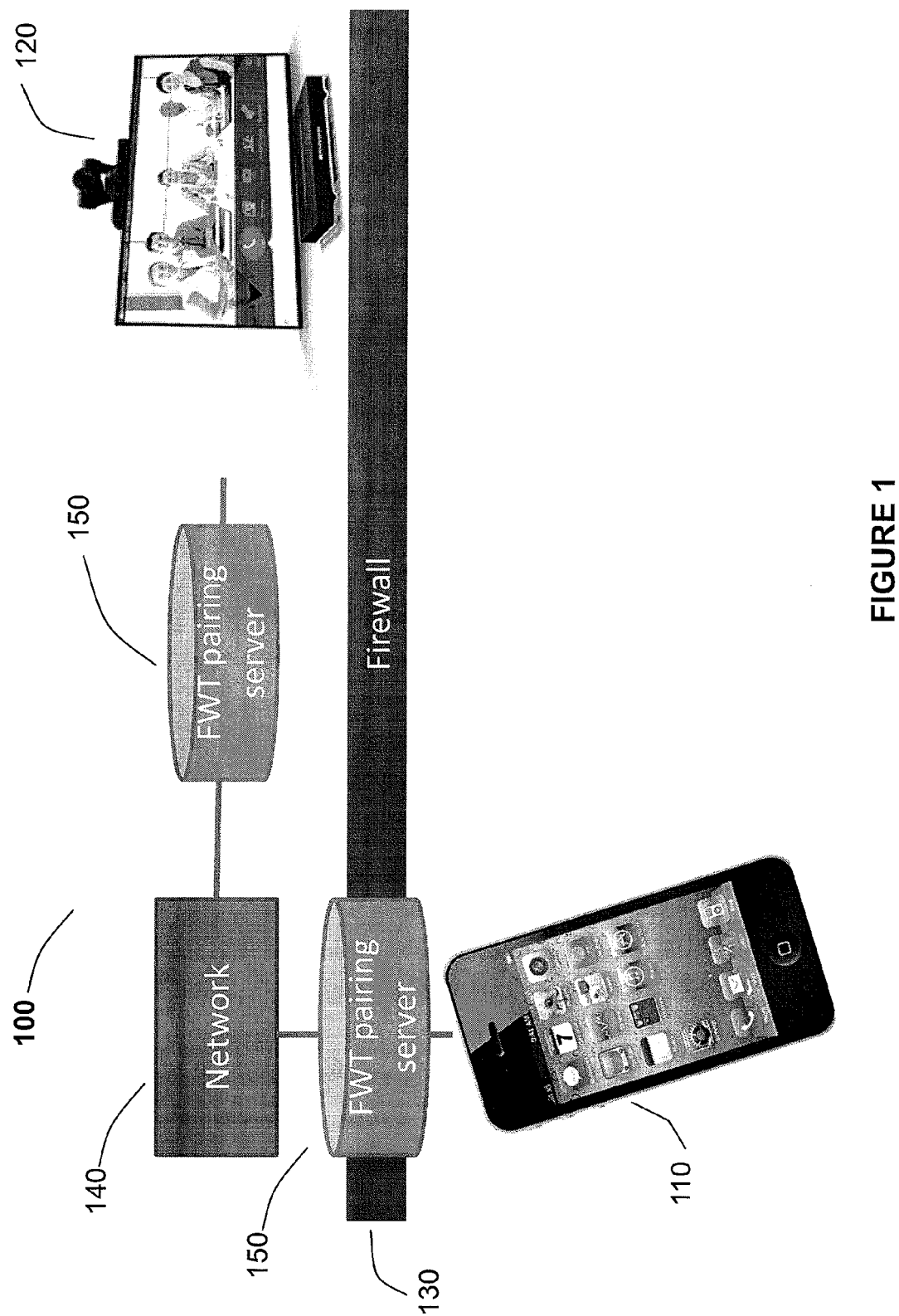
FIG. 1 shows a communication system for connecting a mobile device to a corporate device.

FIG. 1 shows a communication system for connecting a mobile device to a corporate device. The communication system 100 comprises a mobile device 110. The mobile device 110 connects to a corporate device 120 through a firewall 130 via a network 140 and a pair of FWT (Firewall Traversal) pairing servers 150. The FWT pairing servers 150 are deployed with the network segments in a manner so as to create a route from the guest WiFi network 140 to the network segments that host the relevant corporate devices 120.

In an embodiment of the invention, the system utilizes a low data rate and direct communication proximity sensing channel between the mobile device 110 and the corporate device 120. US Patent Publication 2011/0016204 describes a procedure to perform using a low data rate and direct communication proximity sensing channel. US Patent Publication 2011/00116204 is herein incorporated in its entirety. Those skilled in the art will understand proximity sensing techniques and methodologies that may be utilized with the invention. Proximity sensing may, for example, incorporate proximity sensors utilizing electromagnetic fields or a beam of electromagnetic radiation. Proximity sensing may also incorporate GPS sensing techniques.

In an embodiment of the invention, the pairing operation is conducted by the FWT pairing server 150. The system 100 runs the pairing and authorization operation in the same server as the one that handles the tunneling operations. The system 100 may also run the pairing and authorization operation on a separate server. It is understood that the tunneling operation may be a service provided by a server. Further, the pairing and tunneling services and operations may be independent or dependent. These operations may be incorporated with other unrelated services.

During the pairing operation, the user will provide credentials to the FWT pairing server 150. This credential information is authenticated in relation to an enterprise user authorization service. The procedure may also be performed for a guest user. A guest user is one that may not have current credentials. It is understood that the system may limit the tunneled networked protocols according to the user credentials.

The pairing operation may be triggered by the corporate device or by the mobile device with a 1-way or 2-way communication. Those skilled in the art will understand how to initiate the pairing operation based on this disclosure from either end of the communication.

The pairing operation may be enabled to reject the mobile device according to the type of device, user credentials, system configuration, user authorization settings in the corporate directory, corporate device settings, corporate device state or status, or other qualification as may be understood in the art.

The pairing operation and further specific communication may require manual authorization on the corporate device prior to conclusion of the pairing operation.

Once the user is authenticated and the pairing operation is completed, the FWT pairing servers 150 are enabled to allow predefined IP protocol communication between the mobile device and the corporate device. The FWT route may comprise a set of cascaded FWT servers installed in different network segments in the WiFi guest network, DMZ or corporate network.

The pairing operation may trigger the creation of a tunneling route between the mobile device and the corporate device. The tunnel addresses and ports can be provided to the devices during the pairing process. The tunnel addresses and ports can also be used for unicast direct IP communication between the pairing devices.

The firewall traversal operation may be done by protocol tunneling or by dynamic security settings in the corporate firewall. Computer networks use a tunneling protocol when one network protocol (the delivery protocol) encapsulates a different payload protocol. By using tunneling one can (for example) carry a payload over an incompatible delivery-network, or provide a secure path through an untrusted network. Tunneling typically contrasts with a layered protocol model such as those of OSI or TCP/IP. The delivery protocol usually (but not always) operates at a higher level in the model than does the payload protocol, or at the same level.

The firewall traversal operation may include NAT address rewrite. It is understood that NAT traversal is a general term for techniques that establish and maintain Internet protocol connections traversing network address translation (NAT) gateways. Network address translation breaks end-to-end connectivity. Intercepting and modifying traffic can only be performed transparently in the absence of secure encryption and authentication. NAT traversal techniques are typically required for client-to-client networking applications, especially peer-to-peer and Voice over IP (VoIP) deployments. In computer networking, Network Address Translation (NAT) is the process of modifying IP address information in IPv4 headers while in transit across a traffic routing device. The simplest type of NAT provides a one-to-one translation of IP addresses. RFC 2663 refers to this type of NAT as basic NAT, which is often also called a one-to-one NAT. In this type of NAT only the IP addresses, IP header checksum and any higher level checksums that include the IP address are changed. The rest of the packet is left untouched (at least for basic TCP/UDP functionality; some higher level protocols may need further translation). Basic NATs can be used to interconnect two IP networks that have incompatible addressing. However, it is common to hide an entire IP address space, usually consisting of private IP addresses, behind a single IP address (or in some cases a small group of IP addresses) in another (usually public) address space. To avoid ambiguity in the handling of returned packets, a one-to-many NAT must alter higher level information such as TCP/UDP ports in outgoing communications and must maintain a translation table so that return packets can be correctly translated back. RFC 2663 uses the term NAPT (network address and port translation) for this type of NAT. Other names include PAT (port address translation), IP masquerading, NAT Overload and many-to-one NAT. Since this is the most common type of NAT it is often referred to simply as NAT.

The firewall traversal operation may shift a broadcast protocol message on a DMZ sub-network to address specific protocol messages on the corporate side. This may also happen in reverse. The DMZ subnet is understood to be any guest, WiFi or external subnet.

The firewall traversal operation may monitor, modify and filter selected packets. The firewall traversal may decrypt and/or (re)encrypt the network traffic while it traverses the FWT server. The firewall traversal may perform protocol level changes on the traffic traversing through the server. This may be such as changing messages or adding messages or otherwise. The firewall traversal may include content manipulation. This may be such as video and audio transcoding and resizing or other manipulation. The firewall traversal may include dynamic assignment of the FWT pairing server per each connection for load balancing purposes. The firewall traversal may include a dynamic assignment of a FWT pairing server per each connection according to network proximity considerations.

Figure 2:
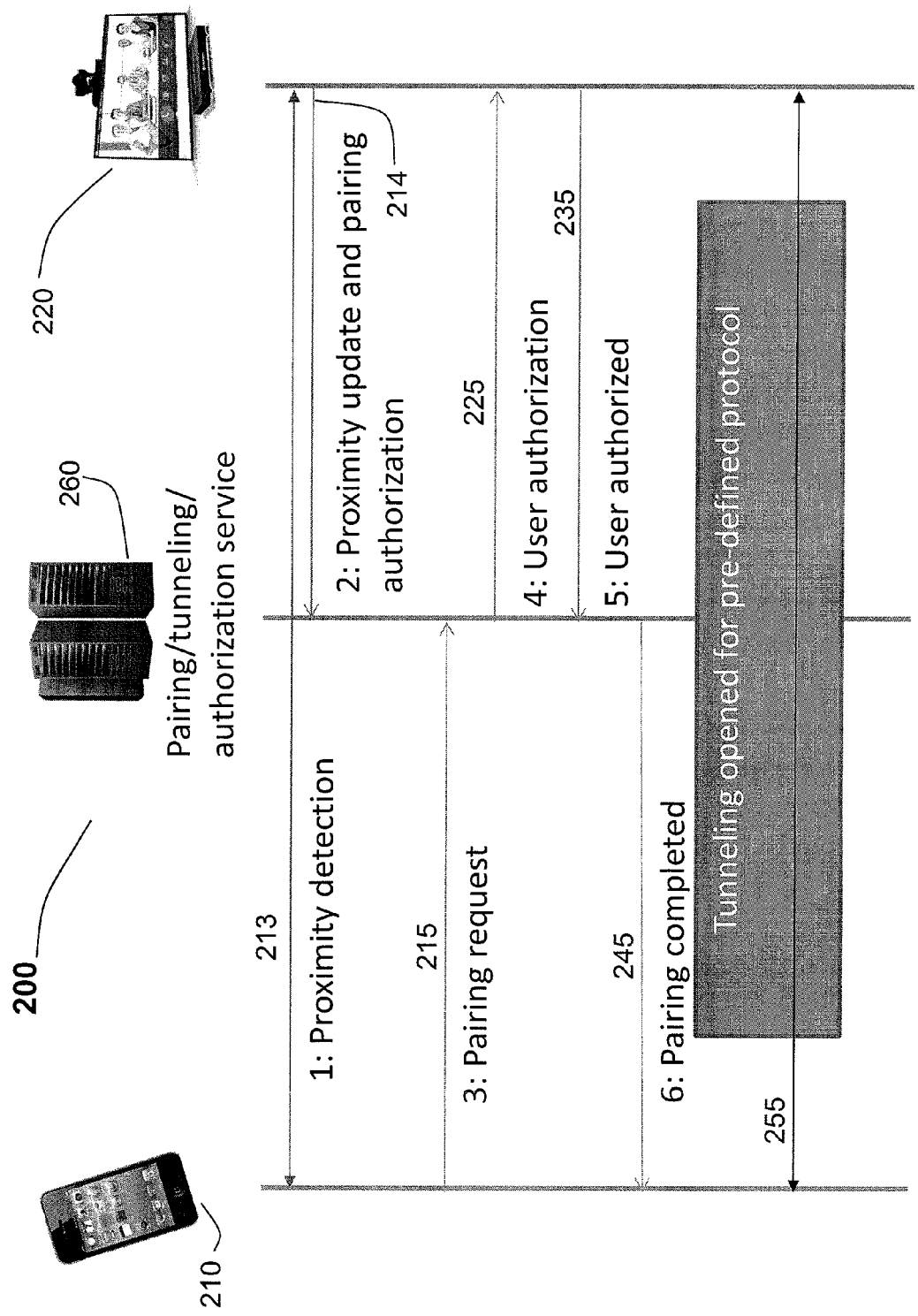
FIG. 2 is a flow diagram for connecting a mobile device to a corporate device.

FIG. 2 is a flow diagram for connecting a mobile device to a corporate device. Initially, a proximity detection is performed 213 between the mobile device 210 and the corporate device 220. A proximity update and pairing authorization 214 is provided to the pairing/tunneling/authorization service 260. It is understood that the pairing/tunneling/authorization service 260 may comprise two or more firewall traversal servers and a firewall traversal server chain. This proximity update and pairing authorization 214 is based on the proximity detection 213. The mobile device 210 will make a pairing request 215. The pairing request is sent to a firewall traversal server chain 260. It is understood that the firewall traversal server chain 260 performs pairing, tunneling and authorization services. The firewall traversal server chain 260 may be referred to as a pairing/tunneling/authorization service 260. The pairing/tunneling/authorization service 260 sends a user authorization request 225 to a corporate device 220. The corporate device 220 will send a user authorization response 235 to the firewall traversal server chain 260. The pairing/tunneling/authorization service 260 will complete the pairing

245. A tunneling is opened for the pre-defined protocol 255 identified during the pairing process.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method for traversing a firewall, said method comprising:
    sending a pairing request from a mobile device to a pairing and tunneling authorization service;
    sending a user authorization request from said pairing and tunneling authorization service to a corporate device;
    receiving a response to said user authorization from said corporate device at said pairing and tunneling authorization service;
    completing the pairing request;
    detecting when said mobile device is in proximity to said corporate device; and
    sending a proximity update and pairing authorization from said corporate device to said pairing and tunneling authorization service.

2. The method of claim 1, wherein said pairing and tunneling authorization service comprises at least two firewall traversal servers.

3. The method of claim 1, wherein said pairing and tunneling authorization service resides on a corporate perimeter network.

4. The method of claim 1, wherein said user authorization is for a guest user.

5. The method of claim 1, further comprising triggering the creation of a tunneling route between the mobile device and the corporate device.

6. The method of claim 5, wherein said tunneling route comprises tunnel addresses and ports and are provided to the mobile device and the corporate device by the pairing and tunneling authorization service.

7. The method of claim 1, further comprising, when the pairing request is completed, allowing, via the pairing and tunneling authorization service, predefined IP protocol communication between the mobile device and the corporate device.

8. The method of claim 1, further comprising enabling dynamic security settings in the firewall.

9. A system for traversing a firewall, said system comprising:
    a mobile device;
    a corporate device; and
    a pairing and tunneling authorization service;
    wherein said mobile device is enabled to send a pairing request to said pairing and tunneling authorization service, said pairing and tunneling authorization service is enabled to request and receive authorization for said mobile device from said corporate device and complete the pairing request between said mobile device and said corporate device; and
    wherein said corporate device is enabled to sense when said mobile device is in proximity to said corporate device and to send a proximity update and pairing authorization to said pairing and tunneling authorization service.

10. The system of claim 9, wherein said pairing and tunneling authorization service comprises at least two firewall traversal servers.

11. The system of claim 9, wherein said firewall traversal server chain resides on a corporate perimeter network.

12. The system of claim 9, wherein said user authorization is for a guest user.

13. The system of claim 9, wherein the firewall traversal server chain is further enabled to trigger the creation of a tunneling route between the mobile device and the corporate device.

14. The method of claim 13, wherein said tunneling route comprises tunnel addresses and ports and are provided to the mobile device and the corporate device by the firewall traversal server chain.

15. The method of claim 9, wherein said firewall traversal server chain is further enabled, when the pairing request is completed, to allow predefined IP protocol communication between the mobile device and the corporate device.

16. The method of claim 9, wherein said firewall traversal server chain is further enabled to provide dynamic security settings in the firewall.

\* \* \* \* \*